United States Patent
Hagg et al.

(10) Patent No.: US 7,840,798 B2
(45) Date of Patent: Nov. 23, 2010

(54) METHOD FOR DATA TRANSFER IN A NETWORK

(75) Inventors: Wilhelm Hagg, Korb (DE); Arnd Krusche, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1378 days.

(21) Appl. No.: 11/270,995

(22) Filed: Nov. 10, 2005

(65) Prior Publication Data
US 2006/0123474 A1   Jun. 8, 2006

(30) Foreign Application Priority Data
Nov. 12, 2004   (EP)   ................... 04026914

(51) Int. Cl.
*H04L 29/06* (2006.01)
(52) U.S. Cl. ...................................... 713/152
(58) Field of Classification Search ................ 713/152
See application file for complete search history.

(56) References Cited

U.S. PATENT DOCUMENTS

| | | | |
|---|---|---|---|
| 6,003,084 A | 12/1999 | Green et al. | |
| 6,981,140 B1 * | 12/2005 | Choo | 713/164 |
| 7,313,687 B2 * | 12/2007 | Kaler et al. | 713/152 |
| 7,424,739 B2 * | 9/2008 | Pessach | 726/17 |
| 2001/0033554 A1 | 10/2001 | Ayyagari et al. | |
| 2003/0005279 A1 * | 1/2003 | Valenci et al. | 713/150 |

FOREIGN PATENT DOCUMENTS

| | | |
|---|---|---|
| DE | 102 54 285 | 6/2004 |
| EP | 1 361 713 | 11/2003 |

OTHER PUBLICATIONS

Altotec GmbH: "Simple UPNP Proxy Protocol (SUPP) Architecture version 0.91" Internet Citation, Feb. 4, 2002, pp. 1-57, XP002227050.

Amirfaiz F E Ed—Institute of Electrical and Electronics Engineers: "Design and Implementation of a Generic Gateway" Proceedings of the Computer Networking Symposium. Washington, Nov. 17, Nov. 1986, pp. 205-213, XP000812879.

* cited by examiner

*Primary Examiner*—Kambiz Zand
*Assistant Examiner*—Teshome Hailu
(74) *Attorney, Agent, or Firm*—Oblon, Spivak, McClelland, Maier & Neustadt, L.L.P.

(57) ABSTRACT

First transmission data of a first device is received within a lower network layer and is processed, generating first intermediate layer data of an intermediate network layer. The first intermediate layer data is processed, generating higher layer data of a higher network layer. The higher layer data is processed, generating second intermediate layer data of the intermediate network layer. The second intermediate layer data is processed, generating second transmission data received by a second device. The processing the first intermediate layer data or the processing the higher layer data includes a security function. The first transmission data, the first intermediate layer data, the higher layer data, the second intermediate layer data, or the second transmission data includes a command or an action that allows to control the second device by the first device or vice versa. The security function includes a blocking or a modification of the command or action.

15 Claims, 7 Drawing Sheets

METHOD FOR DATA TRANSFER IN A NETWORK

The invention relates to a method for data transfer in a network and to a sophisticated gateway being connectable with at least one device.

In a network, in particular in a network used in the car environment, it often occurs that new devices are connected to the network. For example, in a car network, a user may want to bring his personal multimedia device, e.g. a Bluetooth-player, USB—(Universal Serial Bus) player or mobile phone into the car and connect the device to the car bus. In order for a connection to be established between the network and the device, the device is connected to a gateway that is part of the network or connected thereto. In order for said device being able to communicate with other devices connected to the network or exchanging data with the network, so-called proxy modules are used. These proxy modules or services can be provided by a device or by a gateway.

It is possible that said device has a proxy and/or gateway that is programmed, i.e. provided, by the manufacturer of the device and/or gateway, i.e. by a third party vendor. However, such a proxy of a device manufacturer is not under control of the network or the car manufacturer. This is a risk, because the proxy of the device and/or gateway can interfere with the network and cause damages to the stability of the network. For example, said network may not be operable anymore, in case the proxy of the device and/or gateway has affected the network in a serious way. A proxy, device or gateway, that is supplied by a third party vendor, i.e. from an external source, is in the following referred to as insecure proxy, insecure device, and insecure gateway, respectively. A proxy, device and/or gateway, that is supplied by the network manufacturer, e.g. the car manufacturer, is in the following referred to as secure proxy, secure device, and secure gateway, respectively.

In a possible scenario several devices may be connected to said network, wherein said several devices require a certain level of security. For example, the car radio may be connected to the network via a gateway. Then, a device may be connected to the network via an insecure gateway. The device may be for example a Bluetooth-player. Now the user wants to be able to operate his Bluetooth-player via the car radio. This requires that the car radio and Bluetooth-player interact with each other, i.e. exchange data. However, because the Bluetooth-player is connected to the network via an insecure gateway from a third party vendor, it is possible that the Bluetooth-player affects the car radio in an unwanted way. It is possible that the interference of this player with the car radio leads to the car radio not being operable anymore.

It is therefore an object underlying the invention to provide a method for data transfer in a network that enables a secure integration of devices. It is a further object of the invention to provide a sophisticated gateway to which devices requiring a certain level of security may be connected.

To achieve this object, the invention provides a method for data transfer in a network. In addition, the invention provides a sophisticated gateway as well as a network system, a computer program product, and a computer-readable storage medium. Further features and preferred embodiments are respectively defined in the following description.

The network according to the invention comprises a lower network layer, an intermediate network layer, and a higher network layer, at least one first device providing first transmission data of a first standard within said lower network layer, and at least one second device receiving second transmission data of a second standard within said lower network layer. Said first device may e.g. provide said first transmission data via a wired connection such as e.g. USB, IEEE1394, and the like, and/or via a wireless connection such as e.g Bluetooth or WLAN. Said second device may receive said second transmission data via one of the mentioned standards. Said first standard and said second standard may be the same or different standards. The method for data transfer according to the invention comprises the following steps: A first receiving step wherein said first transmission data of said first device are received within said lower network layer; a first lower layer processing step, wherein said first transmission data are processed thereby generating first intermediate layer data of said intermediate network layer; a first intermediate layer processing step, wherein said first intermediate layer data are processed thereby generating higher layer data of said higher network layer; a second intermediate layer processing step, wherein said higher layer data are processed thereby generating second intermediate layer data of said intermediate network layer; a second lower layer processing step, wherein said second intermediate layer data are processed thereby generating said second transmission data; wherein said first intermediate layer processing step comprises a security function; and/or said second layer processing step comprises said security function.

Preferably, said security function ensures that said higher layer data are conform with a predetermined security level, and/or that said second intermediate layer data are conform with said predetermined security level. The predetermined security level can be set by the network administrator and/or network manufacturer, for example, a certain security level may only allow certain actions and/or commands.

Said first intermediate layer processing step corresponds to a presenter proxy service. The presenter proxy service may e.g. be insecure, i.e. said presenter proxy service may be provided by and/or included in a gateway and/or device of a third party vendor. In this case said second layer processing step, which corresponds to an emulator proxy service may comprise a security function. In this example, said second layer processing step, i.e. emulator proxy service is a secure proxy service. This means, that the emulator proxy filters said higher layer data and outputs said second intermediate layer data that are secure.

In other words, the proxy implementing the security function may be both, an emulator or a presenter. Each presenter/emulator pair is translating a device from a bus A to a bus B. If the device is on the protected side, e.g. the car network, the presenter will be the secure proxy. If the device is on the unprotected side, e.g. a mobile device that is translated to the car bus system, the emulator is the secure proxy. To summarize, the secure proxy is the proxy talking to the bus system that needs to be protected.

It is therefore one aspect of the invention to split the proxy service into two different proxy services and/or modules, i.e. said presenter proxy service and said emulator proxy service. Said presenter proxy service and said emulator proxy service may run on different hardware platforms, e.g. on different sophisticated gateways. Said higher layer data may be in a text-based standard. The security of the network therefore becomes extremely high, because the two proxy services, i.e. the presenter proxy service and the emulator proxy service cannot affect each other. Also, the network is secure because said data are processed, filtered and/or adapted, such that said second intermediate layer data are conform with the security level of the network, i.e. said second intermediate layer data may not contain any data that could be harmful to the network or devices connected thereto.

Said first transmission data, said first intermediate layer data, said higher layer data, said second intermediate layer data, and/or said second transmission data may comprise commands and/or actions that allow to control said second device by said first device or vice versa. Said commands and/or actions may e.g. comprise commands relating to certain functionalities of said first device or said second device, e.g. said second device may have a feature such as "increase volume". Now, a user wants to increase the volume of said second device via an operation of said first device. However, said second device may not be able to increase the volume above a certain level. In this case, the command "increase volume" is processed or filtered within said second intermediate layer processing step, such that the volume does not rise above the maximum volume that can be handled by said second device.

Preferably, said commands and/or actions of said first intermediate layer data and/or of said higher layer data are subjected to said security function. Said commands and/or actions may be modified and/or amended thus generating secure commands and/or actions. Secure commands and/or secure action are conform with said predetermined security level. Said security level may be regarded as a list in which all allowed commands and/or actions are defined. Other commands and/or actions may not be allowed and therefore filtered within said first intermediate layer processing step or within said second intermediate layer processing step.

Advantageously, said security function comprises plausibility checks with respect to said commands and/or actions. For example a device may have a certain feature which can only be used, if a respective previous command has been executed by said certain device. In this case, said security function may check whether the respective certain command has been executed prior to allowing the access of said certain feature.

In a preferred embodiment said security function has a security function signature and said network has a network signature, wherein said second lower level processing step comprises a security authentication step, which generates a user prompt, if said security function signature and said network signature are not compatible with each other, wherein said user prompt asks the user if he wants to use said security function, said first device and/or said second device inspite of possible security problems. In other words, in case said security function signature and said network signature are compatible with each other and/or the same, said second lower level processing step is executed and the network can be considered to be secure. However, in case said security function signature and said network signature are not the same, it may be prevented that said second lower level processing step is executed at all, or said second lower level processing step is only executed in case the user explicitly instructs accordingly. As will be discussed below, said security function is associated with an emulator proxy module and/or with a presenter proxy module. This means, by introducing signatures it is possible to avoid that an insecure proxy module is installed that is operated on the protected bus, e.g. the car bus. For that purpose, all proxies or proxy modules on the protected bus may get a signature, as e.g. in the case with e-mails, and the gateway will refuse to install a proxy module with in invalid signature. Thus, it can be guaranteed, that only certified proxies, i.e. proxy modules are installed. A higher level of security can be reached when all proxies need a signature and each company certified to provide proxies get the corresponding key and/or signature to sign their proxies. This way, a secure chain can be established.

Preferably, said first intermediate layer processing step and/or said second intermediate layer processing step is not executed, if said security function signature and said network signature are not compatible with each other and/or a connection between said first device and/or said second device is not established. In other words, if the security function signature and the network signature are not the same and/or compatible with each other, a gateway that is used for executing said first intermediate layer processing step and/or said second intermediate layer processing step will not load a corresponding software module, i.e. proxy module.

Further preferably, said security function comprises the blocking and/or modification of certain actions and/or commands. This means, an application level filtering is performed, wherein certain functionalities are hidden. In other words, the security function may only allow certain actions and/or commands. Filtering means to only allow secure actions/commands to be passed on to the following network layer.

Preferably, within said method, a set of sophisticated gateways is involved, wherein said set comprises at least one sophisticated gateway, wherein said first device is connected to at least a first sophisticated gateway of said set of sophisticated gateways, and said second device is connected to at least a second sophisticated gateway of said set of sophisticated gateways, wherein said first intermediate layer processing step and/or said second intermediate layer processing step are executed on said first sophisticated gateway and/or on said second sophisticated gateway. It is possible that said set of sophisticated gateways only comprises one single sophisticated gateway. In this case said first sophisticated gateway and said second sophisticated gateway are identical.

In a preferred embodiment, a set of sophisticated gateways is involved which comprises at least two sophisticated gateways and said first sophisticated gateway and said second sophisticated gateway are physically separated, such that said first intermediate layer processing step and/or said second intermediate layer processing step may not affect each other. This means, said presenter proxy service and said emulator proxy service are physically separated and running on two different hardware devices, gateways and/or platforms. Said first intermediate layer processing step, i.e. presenter proxy service, is running on said first sophisticated gateway and said second intermediate layer processing step, i.e. said emulator proxy service, is running on said second sophisticated gateway.

Further, a higher network layer may be involved, which is based on a text-based protocol, in particular XML (extensible markup language), such that no executables are able to interfere and/or infect the network. It can thus be prevented that e.g. unintended code, such as viruses and the like, can infect the system and/or the stability of the network.

Preferably, a higher network layer is involved which is based on UPnP standard (UPnP=Universal Plug and Play), HAVI standard (HAVI=Home Audio Video Interoperability), JINI standard (JINI=Jini Network Technology by SUN Inc.), and/or Salutation standard (by Salutation Consortium). Further information on these standards may be obtained from the following web sources:

http://www.upnp.org
http://www.havi.org
http://wwws.sun.com/software/jini
http://www.salutation.org Also, preferably said first standard and said second standard are any of the following standards: IEEE1394, Bluetooth, WLAN (wireless LAN), USB (universal serial bus), and MOST (media oriented systems transport).

In a preferred embodiment, said first sophisticated gateway and said second sophisticated gateway of said set of sophisticated gateways are identical, such that said first intermediate layer processing step and said second intermediate layer processing step are executed on the same gateway. This means, said first intermediate layer processing step and said second intermediate layer processing step are executed on the same device.

Said same gateway may comprise a first processing means and a second processing means, wherein said first processing means and said second processing means are independent and/or separated from each other, wherein said first intermediate layer processing step is executed by said first processing means, and said second intermediate layer processing step is executed by said second processing means. This means, although said first intermediate layer processing step and said second intermediate layer processing step are executed on the same gateway, i.e. the same device, the two corresponding executables may not affect each other, because both processing steps are executed on different and/or independent processing means, i.e. on said first processing means and said second processing means.

A sophisticated gateway according to the invention is connectable with at least one device and/or further sophisticated gateways. Said sophisticated gateway comprises an emulator proxy module adapted for receiving higher layer data of a higher network layer, and for processing said higher layer data thereby generating second intermediate layer data of an intermediate network layer, wherein said processing comprises a security function, e.g., for ensuring that said second intermediate layer data are conform with a predetermined security level. The emulator proxy module thus receives application data, processes this application data and provides the processed application data as second intermediate layer data to an intermediate network layer. The intermediate network layer lies below the higher layer in the OSI-reference model. The processing of said emulator proxy module comprises said security function, such that secure intermediate layer data is generated as said second intermediate layer data. "Secure" means that the data does not contain e.g. any commands and/or actions that could lead to problems in the further processing of said second intermediate layer data. Said emulator proxy module thus has a filtering function.

Preferably, said sophisticated gateway further comprises a presenter proxy module adapted for receiving and processing first intermediate layer data thereby generating said higher layer data. Said first intermediate layer data may be provided by an insecure device and/or gateway.

It is important to note that said sophisticated gateway may comprise said emulator proxy module and/or said presenter proxy module. This means, said sophisticated gateway may only comprise said emulator proxy module or only said presenter proxy module or both, said emulator proxy module and said presenter proxy module.

In a preferred first embodiment, said processing within said presenter proxy module comprises a security function ensuring that said higher layer data are conform with a predetermined security level. This means, it is possible that said emulator proxy module and/or said presenter proxy module perform a security function. Generally, it is not necessary that both proxy modules perform said security function. However, one of the proxy modules performs said security function.

In said first embodiment said sophisticated gateway preferably comprises an intermediate layer receiving means adapted for receiving said first intermediate layer data from said device or from said further sophisticated gateways. Said device and/or said further sophisticated gateway or sophisticated gateways generate said first intermediate layer data from e.g. lower layer data. Therefore, said device or said further sophisticated gateway perform a respective bus service, which means processing lower layer data and generating said first intermediate layer data. Said device and/or said sophisticated gateway therefore comprises a bus service module. In a typical exemplary scenario, said first device, e.g. a USB-device may send first transmission data in the USB-format/standard to said further sophisticated gateway. Said further sophisticated gateway performs a bus service thereby processing said USB-data of said device. After the processing of the USB-data by said bus service, first intermediate layer data is obtained. This first intermediate layer data is then sent to said sophisticated gateway and received from said intermediate layer receiving means.

In a second preferred embodiment, said sophisticated gateway comprises a lower layer receiving means adapted for receiving first transmission data of a first standard and of a lower network layer, and a bus service means adapted for processing said first transmission data thereby generating said first intermediate layer data. In this case said device and/or said further sophisticated gateway does not need to perform a bus service. The bus service is instead executed by said sophisticated gateway. In a typical exemplary scenario, said first device, e.g. an USB-device may send USB-data as first transmission data to said sophisticated gateway. Said sophisticated gateway receives this USB-data via said lower layer receiving means within the lower network layer, in this case the physical USB-layer. The USB-data, i.e. said first transmission data are then processed by said bus service means of said sophisticated gateway, thus generating first intermediate layer data.

Generally, it is possible that said first transmission data, said first intermediate layer data, said higher layer data, and/or said second intermediate layer data comprise commands and/or actions that allow to control said second device by said first device or vice versa. Commands and/or actions can e.g. be "increase volume", "change station", "fast forward", "play", or the like. Depending on the applications, this list may comprise many more commands that will be known by a person skilled in the art.

Advantageously, said emulator proxy module is adapted for processing said commands and/or actions of said higher layer data thereby subjecting said commands and/or actions to said security function. For example, a command that increases the speaker volume with a big step, e.g. by 100%, may be modified and translated in a small increase of only 10%. Also, a maximum value for the volume may be predefined. This may help to avoid dangerous driving situations in the car environment by unintended increase of the speaker volume.

Further advantageously, said presenter proxy module is adapted for processing said commands and/or actions of said first intermediate layer data thereby subjecting said commands and/or actions to said security function. In other words, said presenter proxy module is a secure proxy that filters said commands and/or actions only allowing secure commands and/or actions to be transported to the next network layer, in this case said higher network layer.

Advantageously, said security function comprises plausibility checks with respect to said commands and/or actions.

In a preferred embodiment, said security function has a security function signature and said network has a network signature, wherein said sophisticated gateway comprises a security authentication means adapted for checking whether said security function signature and said network signature are compatible with each other, and impeding the functioning and/or loading of said emulator proxy module and/or of said presenter proxy module, if said security function signature and said network signature are not compatible with each other.

Advantageously, said security function comprises the blocking of certain actions and/or commands. As mentioned, this means that an application level filtering is performed wherein certain functionalities are hidden.

It is preferable, that said higher network layer is based on UPnP standard, HAVI standard, or JINI standard.

Further preferably, said first standard is any of the following standards: IEEE1394, Bluetooth, WLAN, USB, and MOST.

A network system according to the invention is capable of performing or realizing a method for data transfer defined above and/or the steps thereof.

A computer program product according to the invention comprises computer program means adapted to perform and/or to realize a method for data transfer as defined above and/or the steps thereof, when it is executed on one or a plurality of computers, digital signal processing means, and/or the like.

A computer-readable storage medium according to the invention comprises a computer program product as defined above.

The invention and advantageous details thereof will be explained by way of an exemplary embodiment thereof in the following with reference to the accompanying drawings in which.

Figure 1A:
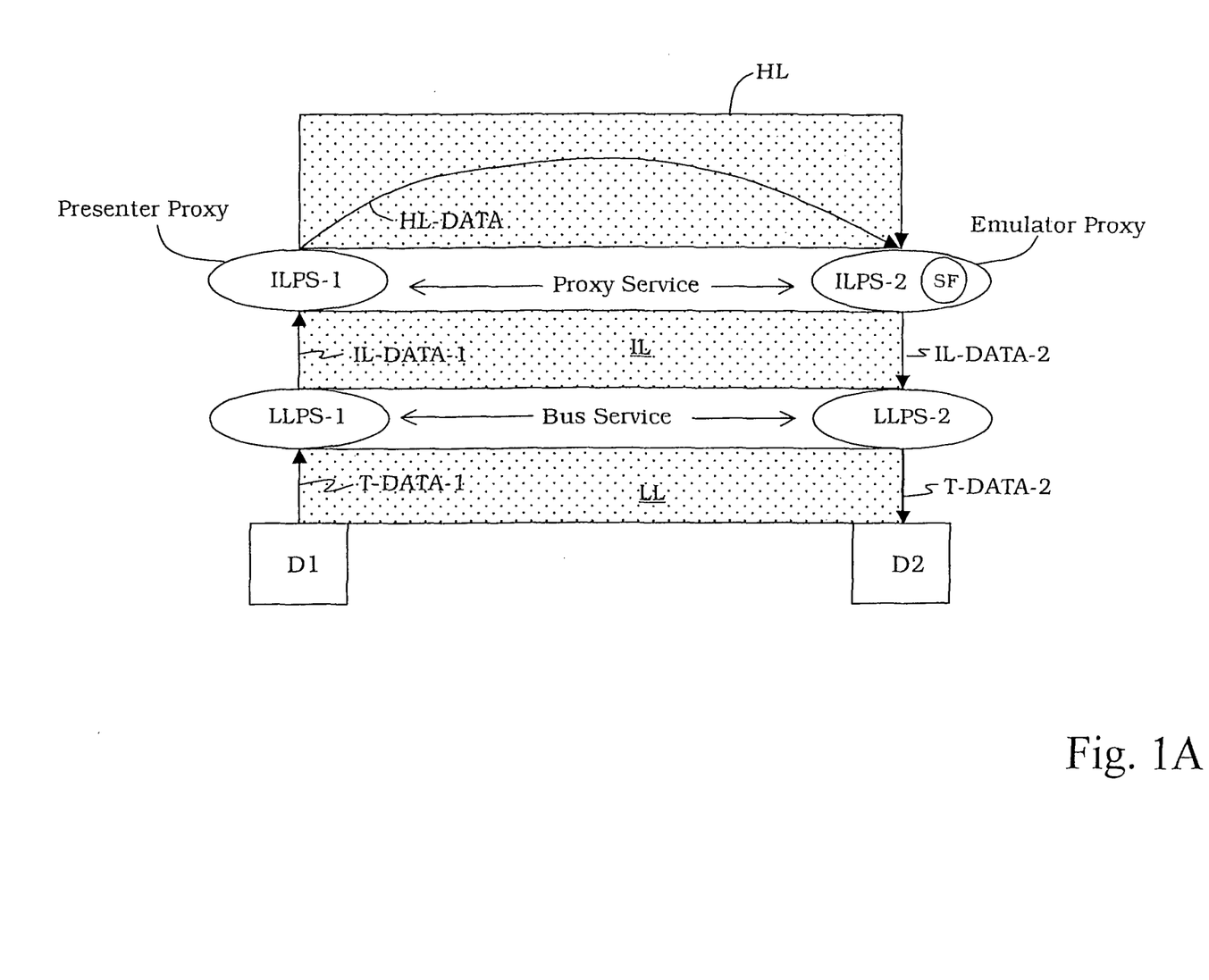
FIG. 1A shows a flow chart comprising steps according to the invention.

In FIG. 1A a first device D1 generates first transmission data T-DATA-1. Said first transmission data are then processed in a first lower level processing step LLPS-1. Said first lower level processing step LLPS-1 corresponds to a bus service. This means, said first transmission data T-DATA-1 are subjected to a bus service, such that the data that are output by said first lower level processing step LLPS-1 are compatible with a standard of an intermediate network layer IL. In other words, said first lower level processing step LLPS-1 converts lower level data, i.e. first transmission data T-DATA-1 of a lower network layer LL to first intermediate layer data IL-DATA-1 of said intermediate network layer IL.

Said first intermediate layer data IL-DATA-1 are then processed within a first intermediate layer processing step ILPS-1. This first intermediate layer processing step ILPS1 corresponds to a presenter proxy service or simply to a presenter that makes said first device D1 visible to a higher network layer HL.

The higher network layer HL corresponds e.g. to an application layer of the OSI-reference model.

The output of said presenter, i.e. said first intermediate layer processing step ILPS-1 are higher level data HL-DATA. These higher level data HL-DATA are supplied to a second intermediate layer processing step ILPS-2.

In one exemplary embodiment said first device D1 may be a USB-device and said USB-device, in particular its function and command set, is presented, i.e. made known to said higher network layer HL via said higher layer data HL-DATA.

Said higher layer data HL-DATA are processed within said second intermediate layer processing step ILPS-2. Said second intermediate layer processing step IL-PS-2 corresponds to an emulator proxy service or simply an emulator that emulates said first device D1. Said first device D1 may e.g. be of a first standard, i.e. said first transmission data T-DATA-1 are of said first standard. Then, said emulator emulates this first device D1 in a different standard, e.g. a second standard.

The output of said second intermediate layer processing step IL-PS-2 are second intermediate layer data IL-DATA-2. Said second intermediate layer data IL-DATA-2 are then processed within a second lower layer processing step LLPS-2. Said second lower level processing step LLPS-2 corresponds to a bus service, i.e. within said second lower level processing step LLPS-2 said second intermediate layer data IL-DATA-2 are processed and second transmission data T-DATA-2 are generated. Said second transmission data T-DATA-2 are of a second standard and supplied to a second device D2.

The explanation of FIG. 1A will be better understood at hand of an example:

In an exemplary embodiment, a user might want to control a second device D2 via said first device D1. For example, said second device D2 may be Bluetooth-headphones and said first device D1 may be a USB-player. Then, the user may want to play a piece of music that is stored on the USB-player. This means, said second device, in this case the Bluetooth-headphones must "see" the USB-player as an emulated Bluetooth-player. Therefore, the USB-player is emulated as a Bluetooth-player within said second intermediate layer processing step LLPS-2, i.e. by said emulator.

As can be seen in FIG. 1A, said second intermediate layer processing step LLPS-2 comprises a security function SF. Said security function processes said higher layer data HL-DATA and generates secure second intermediate layer data IL-DATA-2. As mentioned, said higher layer data HL-DATA comprise actions and/or commands of said first device D1 that need to be executed by said second device D2. Said first device D1 may be of a third party vendor and therefore a potential risk to the stability of the network, i.e. said first device D1 and/or said first intermediate layer processing step ILPS-1 are insecure. Because said first device D1 and/or said first intermediate layer processing step ILPS-1 are insecure, said higher layer data HL-DATA can be insecure. When supplying these insecure second higher layer data HL-DATA to said second device D2 and/or said second lower level processing step LLPS-2, this can cause problems for the network and/or said second device D2 in terms of stability or robustness. Said security function SF prevents such problems by filtering in particular the actions and/or commands of said higher layer data HL-DATA.

Although not shown in FIG. 1A it is likewise possible that said first intermediate layer processing step ILPS-1 comprises a security function. In this case it might not be necessary that said second intermediate layer processing step ILPS-2 comprises said security function. It is, however, also possible that both processing steps, i.e. said first intermediate layer processing step ILPS-1 and said second intermediate layer processing step ILPS-2 comprise a security function.

In case said first intermediate layer processing step ILPS-1 comprises a security function, said first intermediate layer data IL-DATA-1 are subjected to said security function thus generating secure higher layer data HL-DATA.

Figure 1B:
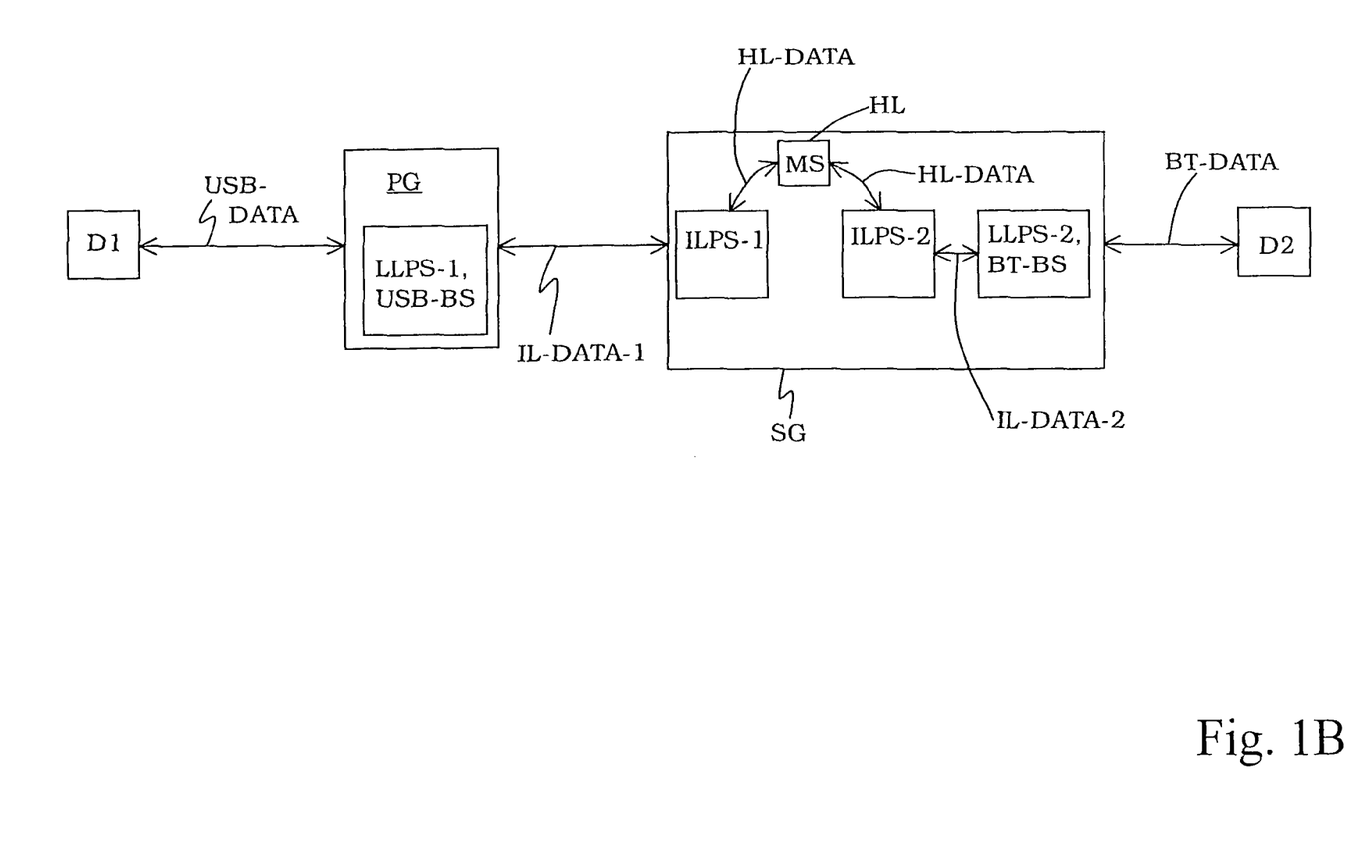
FIG. 1B shows a block diagram with two devices, a physical gateway and a sophisticated gateway.

FIG. 1B shows a network comprising said first device D1, a physical gateway PG, a sophisticated gateway SG and said second device D2. Said first device D1 is connected with said physical gateway, which in turn is connected with said sophisticated gateway SG. Said sophisticated gateway SG is connected with said second device D2. It should be noted that FIG. 1B shows an exemplary embodiment for explaining where the above mentioned processing steps may be performed within an exemplary network.

In the example of FIG. 1B, said first device D1 is an USB-player sending out USB-data USB-DATA to said physical gateway PG. Said physical gateway PG provides said first lower layer processing step LLPS-1, i.e. a USB-bus service USB-BS. This means, within said physical gateway PG, said first intermediate layer data IL-DATA-1 are generated, which are then transmitted to said sophisticated gateway SG. Said first intermediate layer data IL-DATA-1 are then processed within said first intermediate layer processing step ILPS-1, i.e. said first intermediate layer data IL-DATA-1 are subjected to said presenter proxy service within said security gateway SG. Further, within said sophisticated gateway SG, said higher network layer HL receives the higher layer data HL-DATA, which are outputted by said first intermediate layer processing step ILPS-1. Said higher layer data HL-DATA are processed by said second intermediate layer processing step ILPS-2. Afterwards, and still within said sophisticated gateway SG, said second intermediate layer data IL-DATA-2 are processed within said second lower layer processing step LLPS-2. This means, said sophisticated gateway SG performs a respective bus service. In the example of FIG. 1B, said second device D2 is a Bluetooth-device, e.g. Bluetooth-headphones. Therefore, said sophisticated gateway SG is providing a Bluetooth bus service BT-BS.

It should be understood that the term "physical gateway" refers to a gateway that does not provide any proxy service. In the example of FIG. 1B, said physical gateway PG only provides a USB bus service USB-BS, but no proxy service. It is also possible that a physical gateway PG does not even have a bus service. In this case, said USB-data are routed directly to a sophisticated gateway SG that performs the respective bus service.

Figure 2:
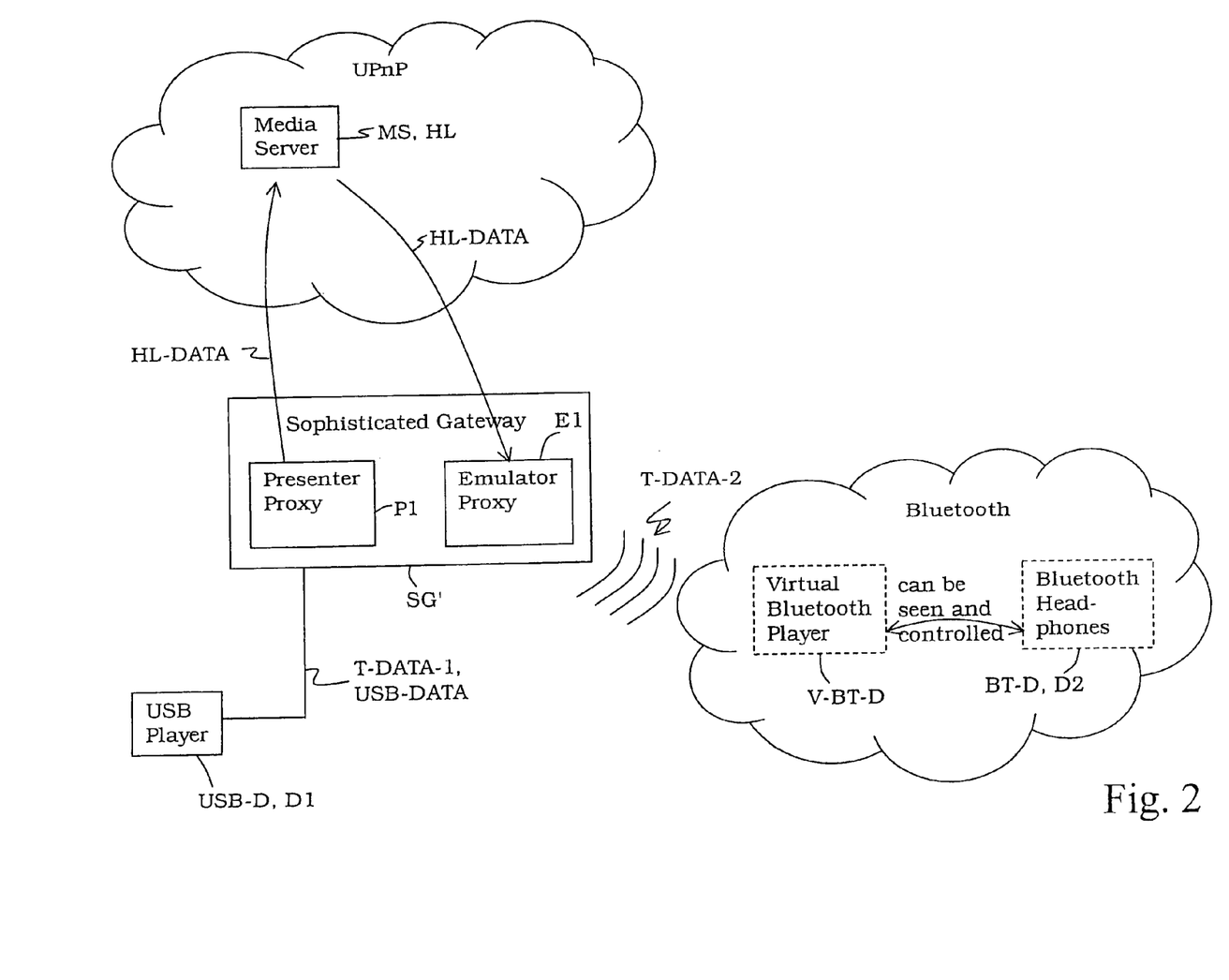
FIG. 2 shows a block diagram with two devices connected to a sophisticated gateway.

FIG. 2 shows an example of a network wherein only one sophisticated gateway SG' exists, to which a USB-device USB-D is connected to, e.g. a USB-player. Further, a Bluetooth-device BT-D, e.g. Bluetooth-headphones, are connected to said sophisticated gateway SG'. Said USB-player sends USB-data USB-DATA to said sophisticated gateway SG'. Said USB-data USB-DATA corresponds to said first transmission data T-DATA-1. Said sophisticated gateway performs a USB bus service USB-BS (in FIG. 2 not shown) and a presenter proxy service within a presenter proxy module P1. The presenter proxy module P1 thus executes said first intermediate layer processing step IL-PS-1. The outputted data, i.e. said higher layer data HL-DATA are then sent to a media server MS that represents said higher network layer HL. These higher layer data HL-DATA are then processed by an emulator proxy module E1, which executes said second intermediate layer processing step ILPS-2. This leads to the emulation of a virtual Bluetooth-player V-BT-D that can be seen and controlled by said Bluetooth-device BT-D, i.e. said Bluetooth-headphones. That virtual Bluetooth-player V-BT-D corresponds to said USB-device USB-D, i.e. said USB-player.

In the example of FIG. 2, said presenter proxy module P1 is supplied by a third party vendor and therefore is insecure. The commands and/or actions contained in said higher layer data HL-DATA may therefore be harmful to said Bluetooth-device BT-D, i.e. said Bluetooth-headphones. Said emulator proxy module E1 is, however, a secure proxy, i.e. said emulator proxy module checks the commands and/or actions sent out from said media server MS, which receives respective commands and/or actions of said USB-device USB-D. Said emulator proxy module E1 can filter insecure commands and/or actions of said USB-device USB-D, that could lead to problems with said Bluetooth-device BT-D.

Figure 3:
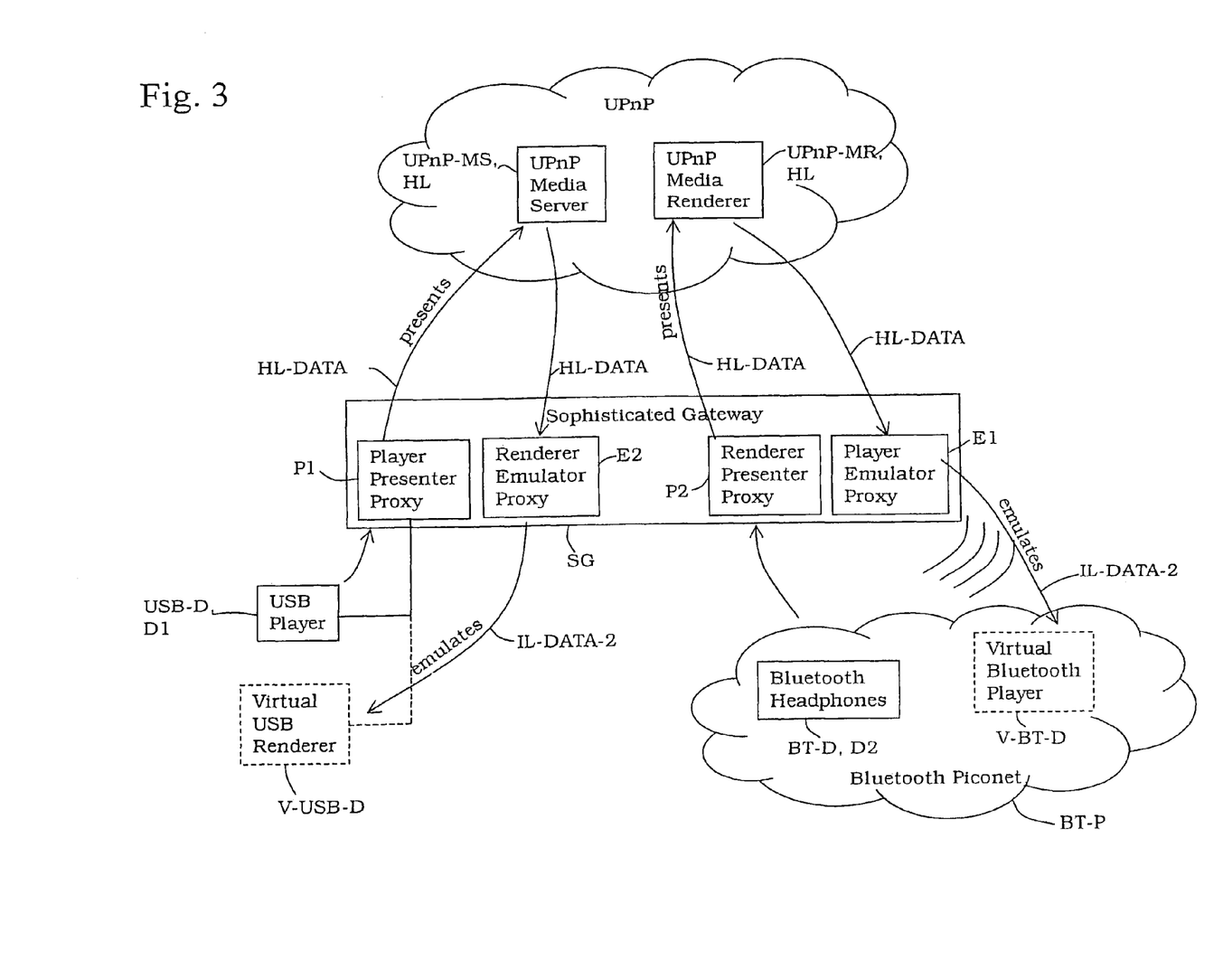
FIG. 3 shows a further block diagram with a sophisticated gateway comprising several proxies.

FIG. 3 shows another exemplary network with a UPnP-media server UPnP-MS and a UPnP-media renderer UPnP-MR that are both representing said higher network layer HL.

In the example of FIG. 3, a USB-device USB-D is connected with a sophisticated gateway SG. Said sophisticated gateway SG comprises a first presenter proxy module P1, i.e. a player presenter proxy module, and a second emulator proxy module E2, i.e. a renderer emulator proxy module. Said first presenter proxy module P1 presents said USB-device USB-D to said UPnP-media server UPnP-MS. Said second emulator proxy module 2 emulates a virtual USB-renderer V-USB-R.

As can be seen, said sophisticated gateway SG of FIG. 3 also comprises a second presenter proxy module P2, i.e. a renderer presenter proxy module, and a first emulator proxy module E1, i.e. a player emulator proxy module. Said second presenter proxy module E2 and said first emulator proxy module E1 are connected to said UPnP-media renderer UPnP-MR representing said higher network layer HL. Said second presenter proxy module P2 is connected with Bluetooth-headphones BT-D, wherein said second presenter proxy module E2 presents said Bluetooth-headphones BT-D to said UPnP-media renderer UPnP-MR. Further, said UPnP-media renderer UPnP-MR is connected with said first emulator proxy module E1 and emulates a virtual Bluetooth-player V-BT-D in a Bluetooth-piconet BT-P. Therefore, said virtual Bluetooth-player V-BT-D is visible for said Bluetooth-headphones BT-D.

It should be noted that in FIG. 3, said UPnP-media server UPnP-MS and said UPnp-media renderer UPnP-MR represent said higher network layer HL. This means, said UPnP-media server UPnP-MS and said UPnP-media renderer UPnP-MR are not performing any kind of processing.

Figure 4:
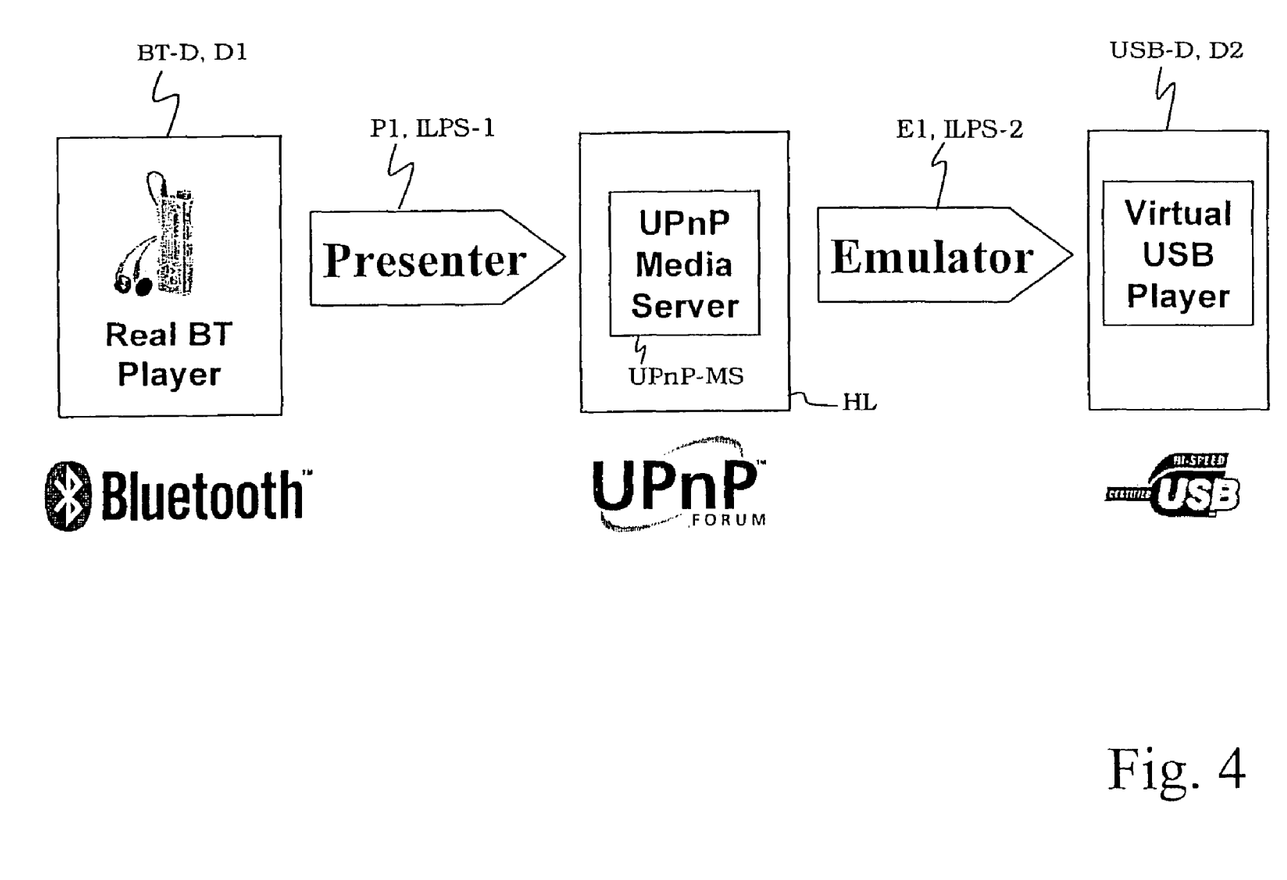
FIG. 4 shows a further block diagram with a general usage scenario.

FIG. 4 shows a general usage scenario, where a Bluetooth-player BT-D as a first device D1 is presented to a UPnP-media server UPnP-MS. The UPnP-media server UPnP-MS is within said higher network layer HL. Said Bluetooth-player BT-D is presented to said UPnP-media server UPnP-MS using a presenter proxy module or simply presenter P1. Within said presenter P1, said first intermediate layer processing step ILPS-1 is performed. Further, FIG. 4 shows an emulator proxy module or simply emulator E1 that emulates a virtual USB-player V-USB-D. In this example, said virtual USB-player V-USB-D corresponds to the physical Bluetooth-player BT-D.

Figure 5:
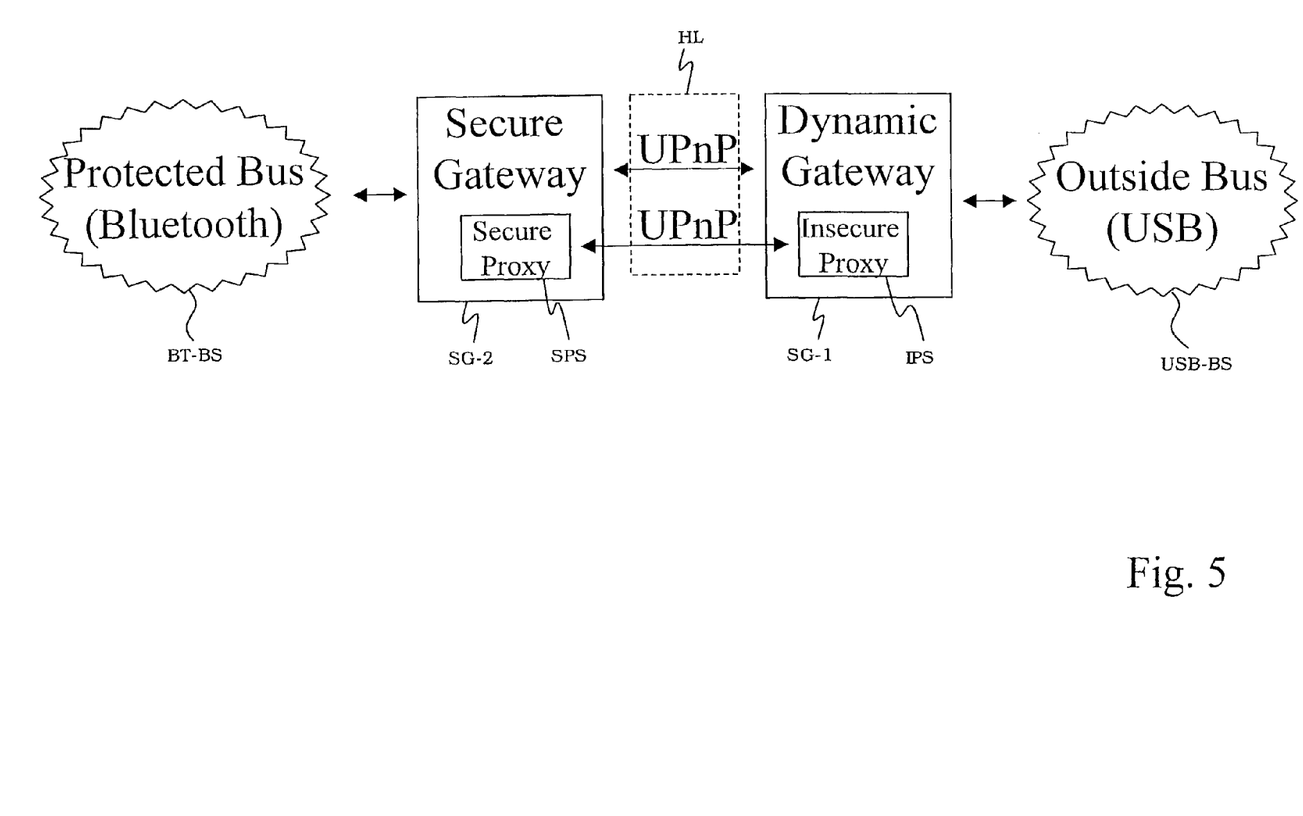
FIG. 5 shows a further block diagram with a secure gateway and a dynamic gateway.

FIG. 5 shows a network with two sophisticated gateways, a first sophisticated gateway SG1 and a second sophisticated gateway SG2. Said first sophisticated gateway SG1 and said second sophisticated gateway SG2 are communicating using the UPnP-standard, i.e. within said higher network layer HL. Said first sophisticated gateway SG1 comprises an insecure proxy service IPS. Said second sophisticated gateway SG2 comprises a secure proxy service SPS. Said first sophisticated gateway SG1 is connected with a USB bus service USB-BS, and said second sophisticated gateway SG2 is connected with a Bluetooth bus service BT-BS. Because said second sophisticated gateway SG2 comprises said secure proxy service SPS, said Bluetooth bus service BT-BS is protected. Said USB bus service USB-BS is connected to said first sophisticated gateway SG1 comprising said insecure proxy service IPS, and therefore said USB bus service USB-BS is insecure. In this example, said first sophisticated gateway SG1 may be provided by a third party vendor and is therefore insecure and dynamic. However, because said second sophisticated gateway SG2 comprises said secure proxy service SPS, said Bluetooth bus service BT-BS can be protected. In the example, said first sophisticated gateway SG1 is thus a dynamic gateway that can be programmed and modified by third party vendors, however, said second sophisticated gateway SG2 is a secure gateway that does not allow any modifications by any third party vendor.

Figure 6:
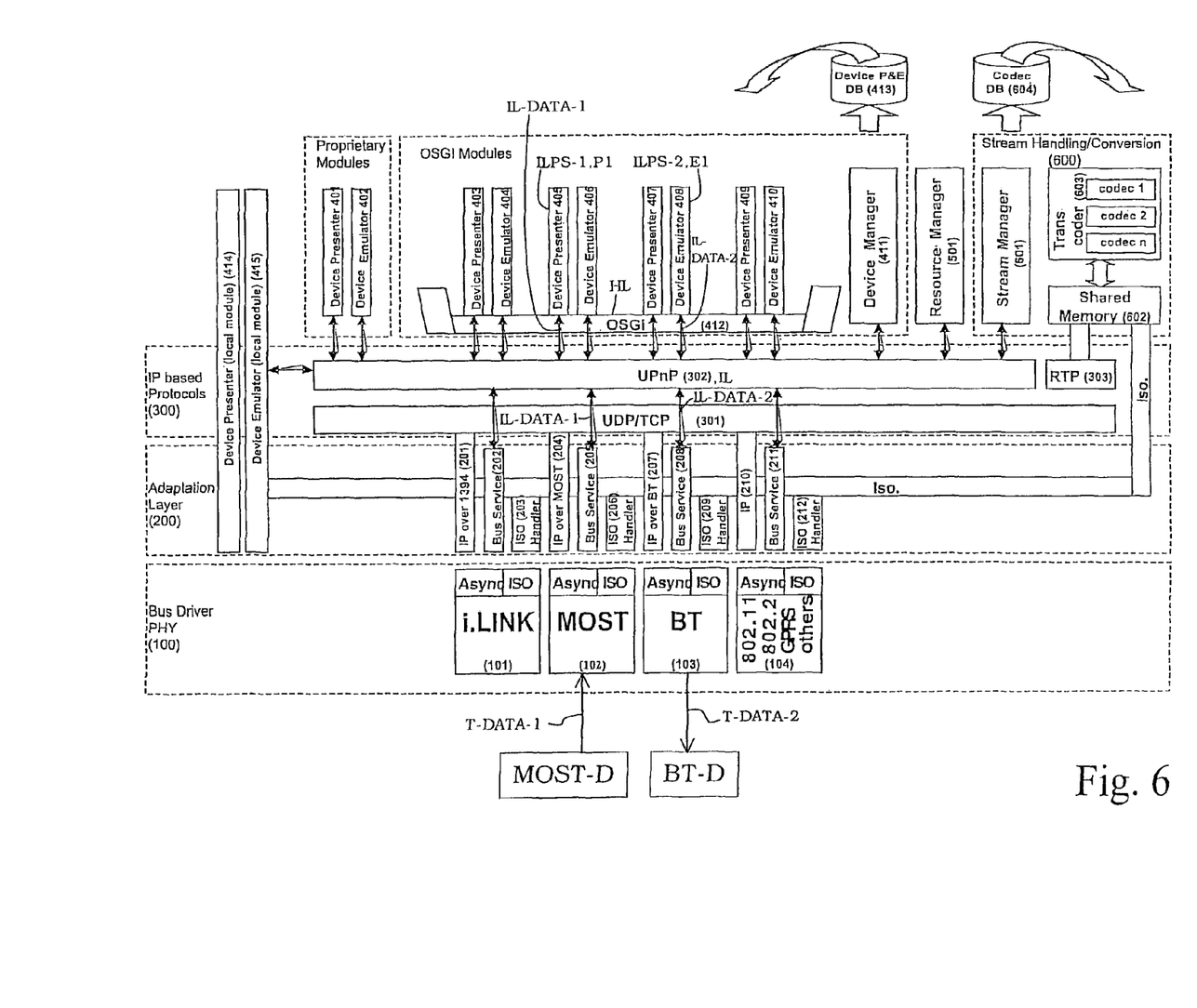
FIG. 6 shows a further block diagram for explaining the data flow and processing between the different network layers.

FIG. 6 shows a block diagram with a lower layer receiving means 102 for receiving MOST-data as first transmission data T-DATA-1. Said lower layer receiving means 102 is connected with a MOST-bus service module 205 generating first intermediate layer data IL-DATA-1. Said first intermediate layer data IL-DATA-1 is supplied to a UPnP-layer 302, i.e. said intermediate network layer IL. FIG. 6 further shows a first presenter proxy module P1 that presents a MOST-device MOST-D that is connected to said lower layer receiving means 102. Said first presenter proxy module P1 generates higher layer data that are supplied to said higher network layer HL, in FIG. 6 denoted with reference sign 412. Said higher layer data is received and processed by a first emulator proxy module E1, in FIG. 6 denoted with reference sign 408. The output of said first emulator proxy module E1 are second intermediate layer data IL-DATA-2 that are supplied to said UPnP-layer 302. Said first emulator proxy module E1 does emulate said MOST-device in an other standard. Here, the standard in which said MOST-device MOST-D is emulated is the Bluetooth-standard. The data provided by said first emulator proxy module E1 is then transferred to a Bluetooth-bus service module BT-BS, in FIG. 6 denoted with reference sign 208. The data outputted by said Bluetooth bus-service BT-BS is then sent to a Bluetooth-device BT-D via a Bluetooth sending means 103. The data sent out by said Bluetooth sending means 103 is denoted with reference sign T-DATA-2, i.e. said data corresponds to said second transmission data T-DATA-2. In the example of FIG. 6, said emulator proxy module E1 is secure, i.e. said emulator proxy module E1 executes said security function, ensuring that said second intermediate layer data IL-DATA-2 are secure.

The following further elucidations may help a person skilled in the art to get a better understanding of the invention or of aspects thereof:

In an application layer gateway devices need to be translated from one communication standard to another by a software module called proxy. The integration of new devices requires to integrate new software modules that are potentially provided by $3^{rd}$ party vendors, e.g. the device manufacturer. This is a potential risk that makes such a gateway insecure. The Invention provides a method for a secure integration of such gateway proxies. In addition the invention enables device integration during a long lifecycle as it is required for the automotive environment.

In prior art gateways a software proxy module that is installed dynamically is a potential risk for the system stability. Especially in the car environment where safety is an important issue, software from $3^{rd}$ party vendors may not be installed on such a gateway. For that reason the integration of devices such as mobile phones by the device manufacturerer is not possible and has to be done by the gateway manufacturer. As a result, devices are not well—and, in particular not securely—integrated in the car environment.

In order to enable a secure integration of mobile devices into the car environment, device manufacturers need to be enabled to provide proxy modules for the integration of their devices. On the other hand, a car manufacturer requires keeping full control over the devices connected to a car-bus in order to avoid security problems. This is done by splitting the task that has to be done in two parts, one provided by the device manufacturer (insecure proxy), another controlled by the car manufacturer (secure proxy).

The task of a Gateway Proxy is to translate application level protocols between two bus systems. This translation task is divided into two parts: one related to the originating bus system, one related to the target bus system. Between both parts, UPnP serves as a reference interface on application level. FIG. 4 demonstrates this splitted Proxy principle for a Bluteooth device that need to be translated into the USB bus system. The first part of the translating Proxy is given by the Presenter P1, which presents the device into the UPnP MultimediaGateway world. The second part is the Emulator E1, which emulates a virtual USB player based on the UPnP Media Server into the USB bus system.

The splitted proxy principle offers several advantages such as e.g.

Reusability: Supporting a new device can be done by just implementing the corresponding Presenter and reusing existing Emulators. Supporting a new bus system can be done by just implementing the Proxies for that bus system and combine them with the existing Proxies from other bus systems.

Simplicity: Implementation of a Proxy requires just knowledge of UPnP and one bus system.

Security: Security critical bus systems, such as car-bus systems, may be protected by providing secure implementations of all proxies connected to that bus. For the other bus systems to be connected insecure $3^{rd}$ party Proxies may then be used.

In order to avoid limitations for devices not specified yet in UPnP, it is possible to use proprietary interfaces for the Presenter/Emulator communication. There might also be situations where a splitted Proxy is not desirable. In that case the Presenter may be implemented as a dummy Proxy simply forwarding everything to an Emulator.

The UPnP interface used in between serves as a reference standard on which device manufacturers may implement their proxy modules. Only commands which are defined by the corresponding UPnP standard may be invoked by such a $3^{rd}$ party proxy. In addition the function set provided by UPnP may be limited by the second proxy or validity checks may be done in the second proxy. For example an abrupt volume increase could be denied, while a smooth increase in volume is allowed.

In order to further improve system security, the proxy modules may be distributed on two or more gateways. The first gateway could run all Presenters and Emulators connecting to the car-bus, e.g. MOST or IDB-M, and is under full control of the car manufacturer. The second gateway provides the Proxies related to the devices that need to be connected to the car-bus. Those proxies may be insecure proxies and provided by the device manufacturers. By applying a text based (XML) technology like UPnP, the module code running on the second gateway is not able to affect the first gateway. Furthermore, the implementations on the two gateways are platform independent, since the proxies are communicating via text based UPnP messages. This enables to combine different technologies in the gateways as it is required due to the long lifecycle of the car compared to those of CE devices.

In order to implement the corresponding interfaces with UPnP, each proxy need to show up as an UPnP device. Assuming that the gateway itself is an UPnP device too, the gateway modules and UPnP interfaces shown in FIG. 6 can be found in a gateway. The following services are offered by the gateway device:

Transport level access to the bus/network interfaces (BusService)

Access to stream transcoding services (Transcoder)

Access to the gateway Proxy execution system (DeviceManager)

In order to make a proxy module available on a second gateway, the proxy module itself shows up as an UPnP device. The device dependent services offered by a proxy module are defined by the UPnP specification of the device type that is represented by the proxy module. In addition the proxy module offers a proxy service for gateway internal housekeeping functions.

While the Multimedia Gateway is a real device, those devices implementing the Proxy service are Proxy software modules representing a real device from one of the connected proprietary bus system.

Insecure Gateway proxy modules from $3^{rd}$ party vendors may be integrated in a gateway by providing a maximum of security. The gateway manufacturer/car manufacturer keeps full control over the gateway functionality.

FIG. 5 explains the overall scenario of the secure gateway. On the left side there is a protected bus system, e.g. Bluetooth. On the right side there is an outside bus which is USB in the example of FIG. 5. The gateway actually consists of two parts, a secure part with preinstalled secure proxies and a dynamic insecure part with potentially insecure proxies. The communication between the two gateways as well as the direct communication between the proxies is done via UpnP. The corresponding UpnP devices and services are shown in FIG. 6. The UpnP Gateway Device is the Gateway itself, e.g. both, the secure and the danymic gateway. The virtual UpnP device is a device simulated by a proxy. In order to translate a device from one bus system to another, two proxies are required: a secure proxy connecting to Bluetooth and an insecure proxy connecting to USB.

Thus, said secure proxy is used to protect the bus system behind it, i.e. within the following network layer. Such a secure proxy is not allowed to be loaded from a potential insecure source. In addition it may have build in security mechanisms such as plausibility checks for commands. Furthermore it may be certified and use an appropriate authentication mechanism in order to be allowed to communicate with other devices in the protected bus system. Furthermore the secure proxy may block certain actions for security reasons.

The invention or aspects thereof thus comprise:

1. An application level gateway module (proxy) consisting of two separated parts, a static secure part (secure proxy) and a dynamic insecure part (insecure proxy) that enables the dynamic use of potential insecure gateway functionality from the insecure proxy in a secure way by routing all communication through the secure proxy.
2. A proxy service, wherein the secure part is certified and enabled to operate within the protected bus by a verification/authentification mechanism within the bus.
3. A proxy service, wherein the secure proxy does plausibility checks on the actions received from the insceure proxy.
4. A proxy service, wherein the secure proxy does application level filtering by blocking certain actions.
5. A gateway device consisting of two parts, a static secure part (secure gateway) and a dynamic insecure part (dynamic gateway) that enables the dynamic use of potential insecure gateway functionality from the insecure dynamic gateway in a secure way by routing all commands and actions through the secure gateway which is not allowed to update any functionality dynamically as with the dynamic gateway.
6. A device, wherein both parts are stand-alone data processing units communicating via text-based protocols (XML) for a high security level, e.g. the code on the insecure gateway does not affect the code on the secure gateway.
7. A device as defined, wherein UpnP is preferably used as the text based protocol for communication between the gateways and the gateway proxies.
8. A device as defined, wherein the secure gateway advantageously only allows selected application level commands to go accross the secure gateway and therefore hiding some functionlities of the protected bus from the dynamic insecure gateway.
9. A device as defined, wherein both parts of the gateway are combined in a single case.

Regarding the wording, used throughout this description, the following table should be observed. The table shows terms currently used as well as alternative terms used in another context, e.g. in stadardization documents and presentations. The last columns show the corresponding historic terms.

| Term | Alternative term | Historic term |
| --- | --- | --- |
| Adaptive Gateway | MultimediaGateway | Generic Gateway |
| Physical Gateway | | Dumb Gateway |
| Extended Physical Gateway | | Static Intelligent Gateway |
| Application Gateway | | Dynamic Intelligent Gateway |
| | | Dynamic Gateway |
| Proxy | | Gateway Device Proxy (Software) Module Proprietary Modules (non OSGI) |
| Embedded Proxy | | Local Modules |
| Device proxy | Insecure Proxy | |
| Car proxy | Secure Proxy | |
| Presenter | | Device Proxy |
| Emulator | | Gateway Proxy |

| Reference Symbols | |
| --- | --- |
| D1 | first device |
| D2 | second device |
| LL | lower network layer, lower layer |
| IL | intermediate network layer, intermediate layer |
| HL | higher network layer; higher layer |
| LLPS-1 | first lower layer processing step |
| LLPS-2 | second lower layer processing step |
| ILPS -1 | first intermediate layer processing step |
| ILPS-2 | second intermediate layer processing step |
| T-DATA-1 | first transmission data |
| T-DATA-2 | second transmission data |
| IL-DATA-1 | first intermediate layer data |
| IL-DATA-2 | second intermediate layer data |
| HL-DATA | higher layer data |
| SF | security function |
| MS | media server |
| USB | universal serial bus |
| BT | Bluetooth |
| PG | physical gateway |
| SG | sophisticated gateway |
| BS | bus service |
| V-BT-D | virtual Bluetooth player |
| P1 | first presenter proxy module |

-continued

| Reference Symbols | |
|---|---|
| P2 | second presenter proxy module |
| E1 | first emulator proxy module |
| E2 | second emulator proxy module |
| UPnP-MS | UPnP media server |
| UPnP-MR | UPnP media renderer |
| BP-P | Bluetooth piconet |
| SPS | secure proxy service |
| IPS | insecure proxy service |
| 102 | lower layer receiving means |
| 205 | MOST bus service module |
| 208 | Bluetooth bus service |
| MOST-D | MOST-device |
| BT-D | Bluetooth-device |

The invention claimed is:

1. A method for data transfer in a network, said network comprising a lower network layer, an intermediate network layer, and a higher network layer, at least one first device providing first transmission data of a first standard within said lower network layer, at least one second device receiving second transmission data of a second standard within said lower network layer, said method comprising:
receiving said first transmission data of said at least one first device within said lower network layer,
processing said first transmission data thereby generating first intermediate layer data of said intermediate network layer,
processing said first intermediate layer data thereby generating higher layer data of said higher network layer,
processing said higher layer data thereby generating second intermediate layer data of said intermediate network layer, and
processing said second intermediate layer data thereby generating said second transmission data received by said at least one second device, wherein at least one of said processing said first intermediate layer data and said processing said higher layer data comprises a security function,
at least one of said first transmission data, said first intermediate layer data, said higher layer data, said second intermediate layer data, and said second transmission data comprises at least one command or action that allows to control said at least one second device by said at least one first device or vice versa, and said security function comprises a blocking or a modification of said at least one command or action.

2. The method according to claim 1, wherein said security function within said at least one of said processing said first intermediate layer data and said processing said higher layer data ensures that at least one of said higher layer data and said second intermediate layer data conforms with a predetermined security level.

3. The method according to claim 1, wherein said at least one command or action of said first intermediate layer data and said higher layer data is subjected to said security function.

4. The method according claim 1, wherein said security function comprises plausibility checks with respect to said at least one command or action.

5. The method according to claim 1, wherein said security function has a security function signature, said network has a network signature,
said processing said second intermediate layer data comprises a security authentication, which generates a prompt, if said security function signature and said network signature are not compatible with each other, and
said prompt asks to use at least one of said security function, said at least one first device, and said at least one second device inspite of possible security problems.

6. The method according to claim 1, wherein said security function has a security function signature, said network has a network signature,
at least one of said processing said first intermediate layer data and said processing said higher layer data is not executed, if said security function signature and said network signature are not compatible with each other, and/or a connection between said at least one first device and/or said at least one second device is not established.

7. The method according to claim 1, wherein a set of sophisticated gateways is involved, said set comprises at least one sophisticated gateway, said at least one first device is connected to at least a first sophisticated gateway of said set of sophisticated gateways, said at least one second device is connected to at least a second sophisticated gateway of said set of sophisticated gateways, and at least one of said processing said first intermediate layer data and said processing said higher layer data is executed on at least one of said first sophisticated gateway and said second sophisticated gateway.

8. The method according to claim 7, wherein the set of sophisticated gateways comprises at least two sophisticated gateways and said first sophisticated gateway and said second sophisticated gateway are physically separated, such that said processing said first intermediate layer data and said processing said higher layer data may not affect each other.

9. The method according to claim 1, wherein the higher network layer is based on a text-based protocol, in particular XML, such that no executables are able to interfere and/or infect the network.

10. The method according to claim 1, wherein the higher network layer is based on a UPnP standard, a HAVI standard, or a JINI standard.

11. The method according to claim 1, wherein said first standard and said second standard are any of the following standards: IEEE1394, Bluetooth, WLAN, USB, and MOST.

12. The method according to claim 7, wherein said first sophisticated gateway and said second sophisticated gateway are identical, such that said processing said first intermediate layer data and said processing said higher layer data are executed on the same gateway.

13. The method according to claim 12, wherein said same gateway comprises a first processing means and a second processing means, said first processing means and said second processing means are independent from each other, said processing said first intermediate layer data is executed by said first processing means, and said processing said higher layer data is executed by said second processing means.

14. A network system, for performing or realizing the method for data transfer according to claim 1, the network system comprising:
a processing unit.

15. A computer-readable non-transitory storage medium encoded with data adapted to perform and/or to realize the method for data transfer according to claim 1, when the data encoding the computer-readable medium is executed on one or a plurality of computers and digital signal processing means.

* * * * *